Nov. 18, 1930.  W. F. HEROLD  1,781,815
CASTER
Filed Dec. 7, 1927
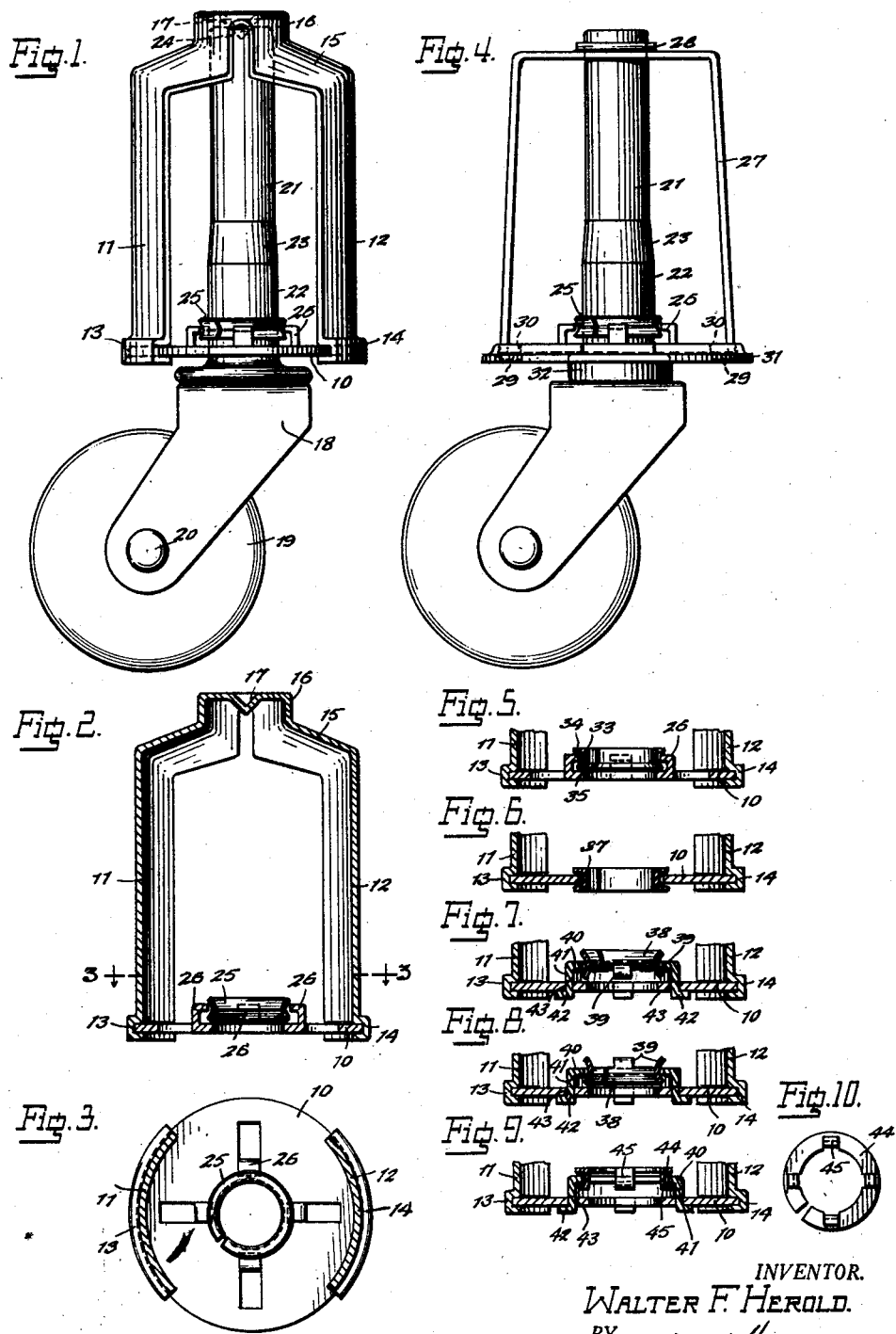

Patented Nov. 18, 1930

1,781,815

UNITED STATES PATENT OFFICE

WALTER F. HEROLD, OF UPPER MONTCLAIR, NEW JERSEY, ASSIGNOR TO THE BASSICK COMPANY, OF BRIDGEPORT, CONNECTICUT, A CORPORATION OF CONNECTICUT

CASTER

Application filed December 7, 1927. Serial No. 238,311.

The present invention relates to improvements in casters, particularly of the type having a caster socket or frame in which the caster pintle is inserted, and has for an object to provide improved retaining means for removably securing the caster pintle in place and which at the same time will permit free swiveling of the caster. The invention relates especially to spring retaining means for the pintle and it is proposed in the present embodiment to provide such means of very simple and inexpensive construction, and having a minimum number of parts adapted to be assembled by modern production methods.

With the above and other objects in view, embodiments of my invention are shown in the accompanying drawings, and these embodiments will be hereinafter more fully described with reference thereto, and the invention will be finally pointed out in the claim.

In the drawings:—

Fig. 1 is a side elevation of a top bearing caster assembly, according to one embodiment of the invention;

Fig. 2 is a vertical sectional view of the socket member, as shown in Fig. 1;

Fig. 3 is a sectional plan view, taken along the line 3—3 of Fig. 2;

Fig. 4 is a side elevation of a modification showing the invention as adapted to a bottom bearing caster;

Fig. 5 is a vertical sectional view partly broken away, of a socket embodying a modified form of the invention;

Figs. 6 to 9 are similar views of further modified forms; and

Fig. 10 is a bottom plan view of the ring employed in the modification shown in Fig. 9.

Similar reference characters indicate corresponding parts throughout the several figures of the drawings.

Referring to the drawings, and more particularly to Figs. 1 to 3 thereof, the caster according to the embodiment shown therein is adapted for insertion in a tubular metal leg, and comprises a base plate or washer 10 having a central aperture, and a frame consisting of side leg portions 11 and 12, bent at their lower ends about the periphery of the base plate, as at 13 and 14, to secure the frame thereto, and a connecting top portion 15 provided with a central domed portion 16 having a top pintle bearing 17 pressed therein, this bearing being in the form of an inverted cone.

The detachable caster consists of the usual horn 18 having a caster wheel 19 rotatably carried therein upon an axle 20, and having a pintle 21 secured in its upper transverse portion, the pintle being provided at its lower portion with an enlarged diameter cylindrical portion 22, tapering as at 23, to the upper smaller diameter portion. At the upper end of the pintle there is provided a cone-shaped recess 24, adapted to engage the center top bearing 17 of the frame.

The pintle retaining means according to the present embodiment consists of a split spring ring 25 adapted to be rotatably connected to the base plate 10 and to frictionally grip upon the pintle. The ring is of rounded V-shape cross-section to provide an annular recess at the outer side and it is rotatably secured to the base plate by a series of lugs 26 struck up from the base plate and bent inwardly into the recess of the ring to loosely retain it in rotatable relation. In the contracted relation of the ring, with the pintle disengaged, the same is centered by the bevel of its recessed outer surface resting by gravity upon the lugs 26, as indicated in Fig. 2. When engaged by the pintle the ring is expanded, its recessed outer surface being of such depth, however, and being so proportioned, that the initial swiveling of the pintle positions it so that it rotates free of the lugs. The V-shape cross-section of the ring, in addition to centralizing the ring and providing a retaining recess, provides a lead surface for the insertion of the pintle.

In Fig. 4 I have illustrated a modified form of socket frame in which the present improvements are embodied. In this form the socket includes an inverted U-shaped spring frame 27 having a flanged aperture 28 in its upper transverse portion for receiving the upper end of the pintle, and having lugs 29 at the lower end of its side leg portions engaged in slots 30 in the base plate and bent inwardly upon the under side to thereby connect the spring frame to the base plate and permit inward contraction of the side leg portions in their engaged relation with the tubular metal leg. The base plate is preferably flanged at its periphery, as at 31, to provide an annular seat for the tubular leg. The pintle is provided with a thrust bearing base 32 and is held vertically by the aperture of the base plate and the flanged aperture 28 of the spring frame. While I have illustrated these two types of sockets it will be obvious that the invention may be embodied in numerous other types comprising a socket and a removable pintle.

In Fig. 5 I have illustrated a modification in which the spring ring 33 is provided with an upper laterally extending flange 34 and with a lower beveled flange 35, these flanges cooperating to retain the ring axially in rotatable relation with the bent lugs 26, and the flange 35 additionally serving as a lead surface for insertion of the pintle.

In Fig. 6 I have illustrated a further modification in which the split spring ring 37 is directly secured in the aperture of the base plate 10, the ring being of channel-shaped cross section to provide an outer annular recess in which the edge of the aperture is disposed.

In Fig. 7 I have illustrated another modification in which the split spring ring 38 of arcuate cross section is provided with a series of downwardly extending bent lugs 39 bent beneath a continuous lateral flange 40, provided upon an annular ring member 41 secured to the base plate 10 by means of lugs 42, engaged through slots 43 in the base plate and bent over upon the under side thereof. The curve of the lugs, it will be noted, provides a lead surface for insertion of the pintle.

The modification shown in Fig. 8 is substantially the same as that shown in Fig. 7, the ring 38, however, being in reversed relation.

In the modification shown in Fig. 9, the split spring ring 44 is flat and disposed above the flange 40, and is provided with a series of downwardly extending lugs 45, slightly inset from the inner periphery pintle engaging surface of the ring, and bent beneath the flange 40 to retain the ring.

I have illustrated and described preferred and satisfactory embodiments of my invention, but it will be obvious that changes may be made therein within the spirit and scope thereof, as defined in the appended claim.

Having thus described my invention, what I claim and desire to secure by Letters Patent is:—

In a support, a floor engaging element including a pintle, pintle receiving means adapted to be secured to a furniture leg or the like and including a base, a split spring ring adapted to be expanded and contracted, ring supporting means carried by said base disposed laterally outwardly of said ring and adapted to retain said ring laterally with respect to said pintle receiving means, said ring including means disposed transversely above and below said supporting means and adapted to confine said ring axially, said ring being adapted to retain said pintle with respect to said pintle receiving means.

Signed at Bridgeport, in the county of Fairfield, and State of Connecticut, this 26th day of November, 1927.

WALTER F. HEROLD.